June 15, 1971  J. W. HANNAH ET AL  3,584,396
MAGNETIC STEPPING DEVICE

Filed Nov. 14, 1968  3 Sheets-Sheet 1

FRED W. WILLIAMSON
JACK W. HANNAH
INVENTORS

BY

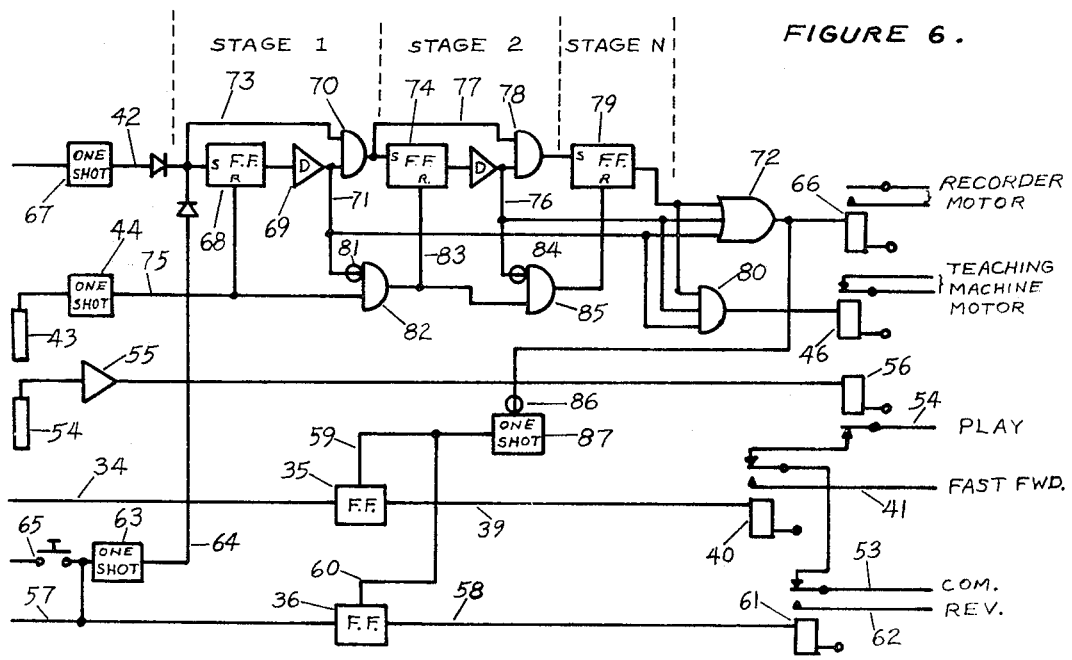

United States Patent Office 3,584,396
Patented June 15, 1971

3,584,396
MAGNETIC STEPPING DEVICE
Jack W. Hannah, 1816 Spring Mill Road, Mansfield, Ohio 44903, and Fred W. Willardson, R.D. 8, Lexington, Ohio 44904
Filed Nov. 14, 1968, Ser. No. 775,654
Int. Cl. G09b 5/06
U.S. Cl. 35—9                                    4 Claims

ABSTRACT OF THE DISCLOSURE

A means for controlling a magnetic tape recorder which utilizes a tape having a plurality of messages linearly arranged whereby said control enables a particular message to be quickly and automatically selected and played when actuated by signals from appropriate teaching machines capable of selecting a particular frame to be viewed from a film containing a plurality of frames. The novel control means thus picks a message in an automatic manner, which message is correlated to a frame being viewed.

---

This invention broadly relates to combined audio-visual presentation means. More specifically, the invention relates to control means for automatically correlating an audio message with a visual presentation wherein a plurality of visual representations are presented in a non-uniform sequence during successive presentation. The invention is particularly adapted for use in teaching machines where visually observed questions and multiple choice answers are presented and are accompanied by audio explanations for each answer.

BACKGROUND OF THE INVENTION

Within the broad scope of what is known as program instruction, there are teaching machines which have a collection of pictures commonly called frames on a film strip that are presented to an operator in a sequence that varies according to the responses the operator makes to questions asked on the frames. Several varieties of such teaching machines are in commercial production. They are characterized by the fact that some of the frames on a film are automatically presented while others are not, that is, each question has a multiple choice answer, but only one answer is chosen by an operator so only one answer frame need be viewed. The particular sequence of presentation varies from student to student, because each student has a somewhat different learning pattern. Thus, such forms of teaching machines allow individual instruction by automatically presenting an instructional sequence appropriate to the particular student. The sequence of presentation is determined frame by frame by the responses of the operator to the questions presented.

A major problem with this instructional technique is that it has been difficult to provide an audio accompaniment to each of the frames. The teaching machines control the movement of the question-answer film strip, so that when a given answer is selected the next frame viewed is automatically selected from a set of frames. The set of frames from which the answer frame is selected comprises a frame corresponding to each of the possible multiple choice answers to a question. The frame selected may be at any linear position on the film strip, and the teaching machine has means for seeking and projecting the one proper frame for the particular response. Teaching machines of the above-noted types are described in U.S. Pats. 3,191,315 and 3,355,819.

Techniques are very common in audio visual devices which associate sound with a visual presentation, but all of the techniques depend on the frames of the film strips being presented linearly, that is, one after another in a linear sequence throughout the film strip. The common method of producing an audio means for presentation is to view the film and record the audio message as each frame is viewed, thus timing the audio presentation to correspond to the linear presentation of the film. It is obvious that this method is limiting and inflexible when the film is projected in a non-linear sequence, such as in the above-noted teaching machines. Hence, it is required that a tape recorder be provided which is keyed to start and stop automatically and as each frame of a visual presentation is presented, the tape recorder must move from sound message to sound message in accordance with the frame being viewed. In the above-described teaching machines and in the previously used systems the sequence of presentation of films has not adapted itself to conventional tape recording controls. Using the above-noted teaching machines, the sequence of presentation of frames is not fixed; rather, it varies with the particular student and thus, the frames are not presented in linear or adjacent order. The frames are randomly located and are viewed by a control means which skips in either a forward or reverse direction along the film strip while searching for the appropriate frame. Previously used means to associate audio presentation with these visual frames are often very expensive and require a coded sound tape and consequently, require means to search the tape and find the code. The herein described invention accomplishes the correlation of an audio presentation with a visual projection means which views the film in non-linear sequence.

OBJECTS

A primary object of this invention is to provide a means whereby a tape recorder can be used to provide automatic accompaniment to pictures selected by automatic means from a plurality of visual presentation frames.

Another object is to provide a control for automatically and accurately stopping a tape recorder according to a signal received from a visual presentation means.

Another object of this invention is to provide an improved control for tape recorders which enables the accurate selection of one of a plurality of messages carried on an audio record.

Another object is to improve the quality of teaching devices by providing an audio accompaniment for visually observed presentations which are viewed in a non-linear sequence.

Still another object of this invention is to provide a control means for a magnetic tape recorder which is economical in operation and construction.

DETAILED DESCRIPTION

A more thorough understanding of the present invention and the advantages thereof will be obtained from a consideration of the following detailed description when considered in conjunction with the drawings, wherein:

FIG. 6 shows a circuit diagram of a device for counting frame movement on a film strip with means for correlating sound portions of the magnetic tape;

FIG. 7 shows a circuit diagram of a device for counting sound portions on a magnetic tape when a coded count signal is provided by a teaching machine;

Figure 1:
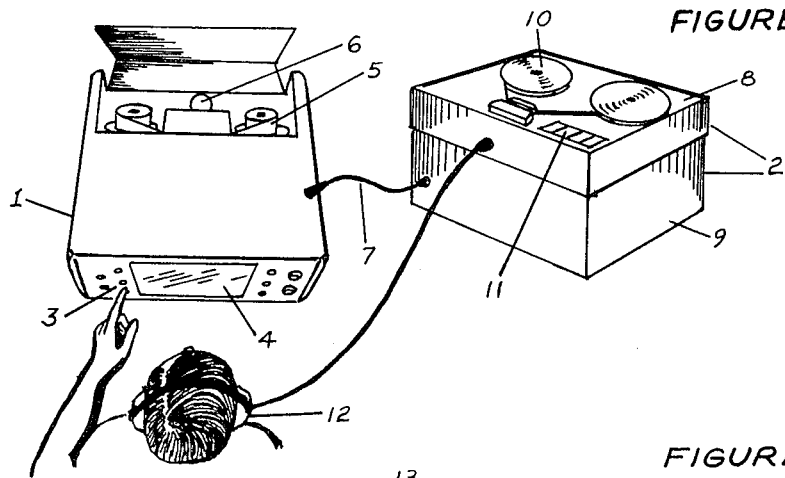
FIG. 1 is a perspective view of the recorder of this invention used in conjunction with a teaching machine capable of selecting one frame from a multiplicity of possibilities.
Figure 2:
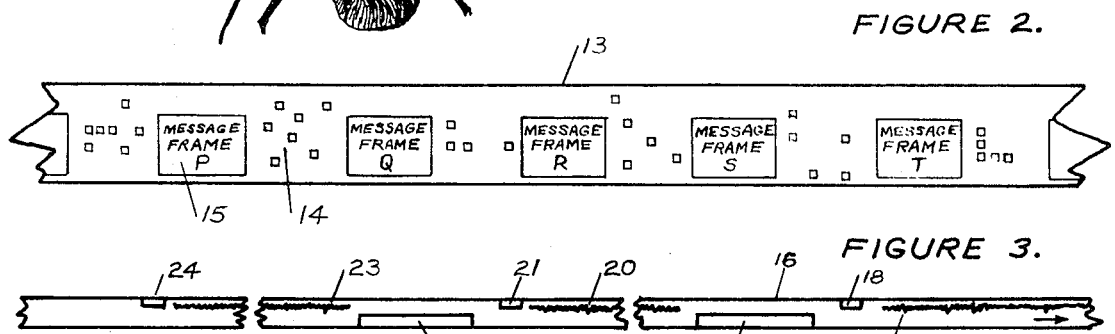
FIG. 2 shows a typical film strip used in a teaching machine having a plurality of frames.

Turning now to the figures, and particularly to FIG. 1, a student is shown seated before a teaching machine 1, studying presentations visually on screen 4. The presentations studied are frames of a film strip which bear instructions, questions, and answers, to which the student responds by selecting one of the push-buttons 3. The teaching machine may suitably comprise the above-noted devices of U.S. Pats. 3,191,315 and 3,355,819. Basically, the students' response is either going to be right or wrong. If it is right, the student will be given a subsequent presentation which is designed to acknowledge his answer and to reinforce his knowledge. If his answer is wrong, he will be given a particular subsequent presentation designed to correct his misunderstanding. Since, of course, only one response is normally correct and several responses are normally wrong, the presentation to be given for a wrong response may be one of several different presentations stored in the programmed film strip. The program is shown as a film strip 5 which travels between two reels in the rear of the teaching machine and has its images projected onto the screen 4 by lamp 6. The general configuration of this film strip is shown in FIG. 2 and is further explained herein. In FIG. 1, there is also shown an audio element 2. As the student wears earphones 12, he listens to audio communication messages designed to accompany and explain the visual presentation seen on the screen 4. The audio system is shown as an audio player unit 2 consisting of a tape recorder 8 and a tape recorder stepping device 9. Tape recorder may be of common monoaural or stereo-types using a reel of tape 10.

The tape recorder must have controls for moving the sound tape in a forward and reverse direction very fast as compared to the speed at which the tape is normally moved during play. Such control is schematically shown as 11 wherein a control panel is utilized.

By way of further explanation of the tape recorder, it will be noted that any conventional recorder including a turn table and tape spool which are rotated by an electric motor having means to vary its speed may be used. It is important for accurate sound reproduction that a tape recorder motor should drive the turn tables and spools within very small tolerances of the desired speed. A suitable motor usually runs on the normal single phase alternating current domestic supplies. A synchronized motor can be relied upon to produce a constant voltage. Such a motor is described in U.S. Pat. 3,209,185. Such a motor is desirable because although it requires a large capacity and a special start run coil to produce sufficient field characteristics required to provide sufficient torque to pull the motor speed back into synchronism with the motor under load, such operation is required. It is obvious that no particular motor is intended to limit this invention, and the above-noted motor is merely illustrative as a suitable system.

In the film strip shown in FIG. 2, the sequence of message frames 15 is unique. In an ordinary film strip presentation, such a film strip would first present frame P, followed next by Q, followed by R, then S, etc. This rigid linear sequence of presentation would not be used by the teaching machine contemplated herein. The machine to which this invention is directed projects a message on, for example, frame P, which provides information or instructions and a question. If the student answers the question correctly in responding to the teaching machine, the film strip can be automatically moved past frames Q and R and the presentation he next receives can be a message on frame S. However, a certain type of incorrect response can cause the next frame he sees to be Q, while still another type of incorrect response can result in passing frame Q and presenting frame R. Therefore, instead of the frames being presented serially, they are selected according to individual responses and a student would only be shown those frames appropriate to the pattern of his learning response. In the teaching machine and film strip shown, the regulation and selection of frame presentations is governed by coding on the film shown at area 14.

Figure 3:
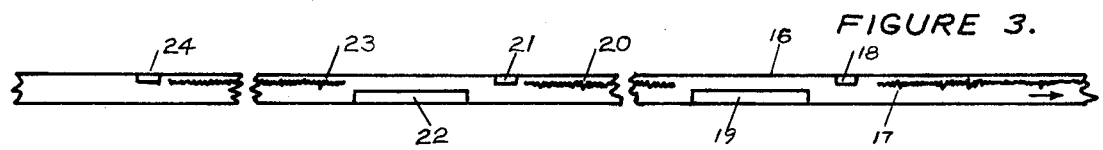
FIG. 3 shows a typical magnetic sound tape used in a tape recorder provided with first coded signal areas.

In order for an audio message to accompany this type of selection, the sound tape must be divided into sound portions, one for each frame of the film strip. FIG. 3 shows a sound tape 16. By way of example, the tape noted above may be utilized or other equivalent tapes. Assuming the sound tape plays its message by moving the tape in the direction of the arrow past a suitable activating device, the message portion corresponding to frame P, 15, is shown at 17. The end of this portion is indicated by a stop 18. The start of the message portion for frame Q is shown as area 19 on the tape, and the message for frame Q is shown as 20, while the stop is 21. The start of the message portion for frame R is shown as area 22. The message is 23 and its stop is 24. Hence, the message portions are arranged serially on the sound tape in the same order as the frames on the film strip 13.

In accordance with this invention, a control is provided to correlate a "skip" on the film from message frame P to message frame S, whereby the teaching machine must move past frames Q and R, with means to play an accompanying tape. The tape must move quickly past two start areas, such as 19 and 22, and begin play on the third start area. Or, one can imagine the student is at frame R and his response indicates he should go back to frame P, which means that the audio taped message he heard while looking at frame R must return to its start position and then move in a reverse direction past one portion of its tape (corresponding to the audio message for frame Q) to the start of the audio portion for frame P and begin the playing of this portion of the sound tape at the same time as frame P is presented on the screen of the teaching machine.

Figure 4:
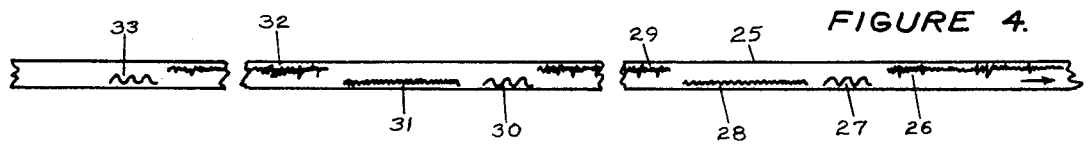
FIG. 4 shows a typical magnetic sound tape used in a tape recorder provided with second coded signal areas.

As FIG. 3 shows, the indications of start and stop functions are provided by specifically detectable areas on the sound tape. These areas, such as 18, 19, 21, 22, 24, may be cleared areas of the tape where the opaque magnetic coating has been removed to leave a transparent area detectable by photoelectric cells. Or, as shown in FIG. 4, a dual track tape may be used with a stereo tape pickup on the recorder such that stop areas are detectable by transmitting a signal of one frequency while the start areas consist of a different frequency. On the sound tape 25, message portions are shown as tracks 26, 29 and 32 (corresponding to 17, 20 and 23 of FIG. 3); stops are tracks 27, 30 and 33 (corresponding to 18, 21 and 24 of FIG. 3); starts are tracks 28 and 31. Throughout the remainder of this disclosure, we will merely refer to the tape recorder stepping device, 9, and diagrammed in FIG. 5, as detecting start signals or stop signals. It is to be understood that either configuration of magnetic tape (FIG. 3 or FIG. 4) and equivalent configurations may be used so that the detector in one case is a pair of photocells (FIG. 3) while in the other case it is a pair of pickup devices (FIG. 4), one attuned to the frequency established for the start signal and the other attuned to the frequency for the stop signal.

The student begins an operation by loading the teaching machine with a film strip to begin at its first frame and by threading the tape recorder with the corresponding tape to begin at the first sound portion. Sound portion and film frame must be started at the same positions. Throughout the study of the lesson, the tape recorder sepping device will keep the sound tape in step with the film frames.

Figure 5:
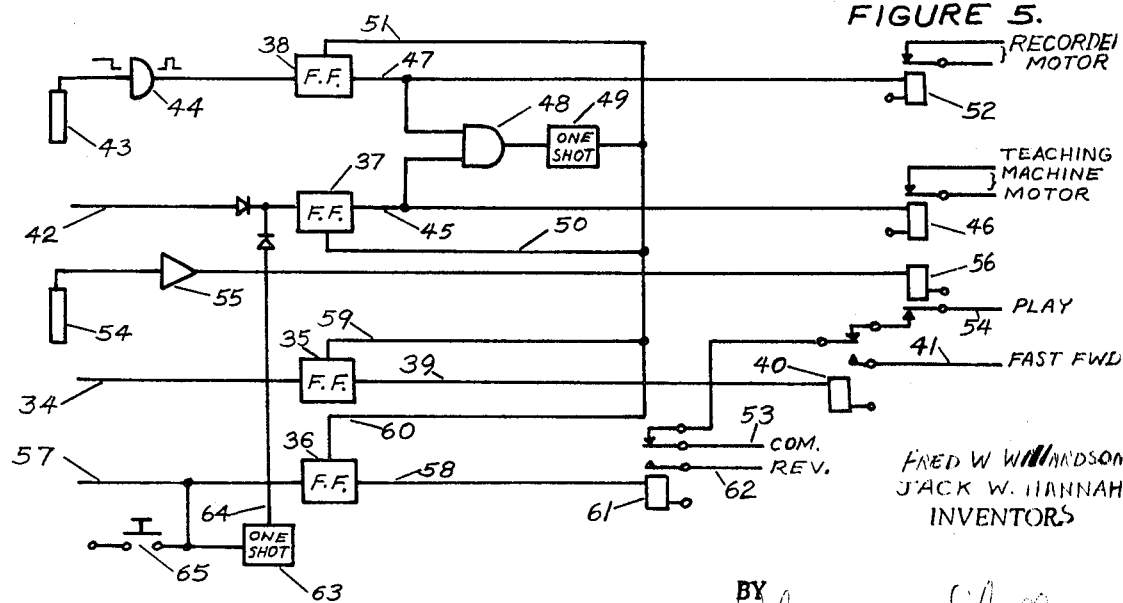
FIG. 5 shows a circuit diagram of a device for lock-stepping frames on a film strip with sound portions on a sound tape.

Turning now to FIG. 5, we shall assume that the student responds to the teaching machine in such a way that it will move its film strip (equivalent to going from message P to message S in FIG. 2). The forward driving signal (all signals from the teaching machine to the tape recorder stepping device are sent through the cable 7 shown in FIG. 1) from the teaching machine appears on line 34 and sets the flip-flop driver circuit, 35. This driver 35, as well as those labeled 36, 37 and 38, all have a common function, an incoming signal of very short duration is capable of setting them so that they give a continuous output signal until another short-duration signal, called a reset, turns off the flip-flop; but an incoming signal which is maintained will cause them to produce a continuous output signal, ignoring all reset signals. Hence, a continuing signal on set line 34 sets the flip-flop 35, which produces an output at the line 39, which activates relay 40, closing a contact from the common supply 53 to the fast forward control of the tape recorder via line 41. The tape recorder will now move its tape in a fast forward condition while the teaching machine is moving its film strip forward. As the teaching machine reaches the first adjacent frame from the one at which the student made his response, it sends out a short duration pulse signal on lead 42 (through cable 7) which sets flip-flop 37. At approximately the same time, maybe slightly before or after, the fast forward winding of the tape recorder will bring the first adjacent portion of the sound tape into playable position and its start area (such as 19, 22, 28, and 31 of FIGS. 3 and 4) will be detected by the sound start signal detector 43. A signal from this detector is transformed into a pulse signal by the leading edge trigger circuit 44, whose output sets flip-flop 38. If the movement of the teaching machine should by chance cause the film strip adjacent frame to reach a projectable position before the corresponding start of the sound tape reaches play position, then flip-flop 37 will be set and produce an output on line 45 to activate relay 46, which removes power from the teaching machine motor. Thus, the film strip will not advance beyond this first adjacent frame until the first adjacent portion of the sound tape reaches playable position; when this happens, flip-flop 38 is set and a signal is present at output 47 as well as at output 45. Signals at both these outputs cause the AND gate 48 to produce an output which triggers the ONE SHOT circuit 49. The function of a one shot circuit is to give a single output electrical pulse of definite duration until reactivated by another input signal. The output of the ONE SHOT circuit 49 is used to reset the flip-flops 37 and 38 by way of the lines labeled 50 and 51. The output of circuit 49 also sends a reset signal to flip-flop 35 via line 59 which is, however, ignored by flip-flop 35 because it is still receiving the continuous signal from line 34. With the flip-flops 37 and 38 thus reset or turned off, the relays controlling power respectively to the recorder motor and to the teaching machine motor 46 and 52, are unoperated so that the motors begin again to drive the tape and the film strip in forward directions. So far what has happened is that the film strip has moved one frame and the sound tape has moved one sound portion from the original starting positions of both, but the student's selection on the teaching machine requires moving past two frames of the film strip. As both the teaching machine and the sound recorder are moving film and tape in the forward direction, the second adjacent frame and the second adjacent start of the sound portion are being approached. Let us suppose that this time the start of the sound portion is reached before the second adjacent frame. The sound start signal detector 43 sends out a pulse through trigger circuit 44 which sets flip-flop 38. The flip-flop 38 output 47 operates relay 52, removing power from the recorder motors. This delays the forward drive of the sound tape in the vicinity of the start area of the second adjacent portion until the second adjacent frame of the film strip "catches on." When it does, a short duration pulse frame gate signal appears on line 42, setting flip-flops 37, and outputs of flip-flops 37 and 38 cause an output from AND gate 48 which results in reset of flip-flops 37 and 38. The relays 46 and 52 become inoperative and the drive motors of the teaching machine and the tape recorder proceed on to the third adjacent frame and third adjacent sound portion respectively.

The third adjacent frame with its third adjacent sound portion are, let us suppose, the frame and sound portion which are to be presented to the student. Therefore, the teaching machine will stop on this frame. Again, as described above, the independent motor drives of the teaching machine and the tape recorder may mean that either one of them may be the first to reach their respective positions for presentation, that is, the teaching machine projecting the frame on the recorder playing the tape portion, but because of the flip-flop and AND gate arrangement described above (items of FIG. 5 labeled 37, 38 and 48), either the tape recorder or the teaching machine will be delayed until the other catches up. When the teaching machine is stopped at this frame because it is about to project the frame on the screen, the driving signal which is on line 34, will be removed; and the reset signal from the ONE SHOT circuit 49 will reset through line 59 the flip-flop 35 so that the output 39 is removed to release relay 40. This releases through line 41, stopping the fast forward mechanism of the tape recorder. The release of relay 40 reconnects the common power supply lead 53 through its normally closed contact to the lead 54 which activates the play mechanism of the tape recorder. Now while the student looks at the visual presentation on the teaching machine screen, the recorder plays the corresponding audio portion.

When the end of the audio portion is reached, the tape (as at areas 18, 21, 24, 27, 30, 33 of FIGS. 3 and 4) provides a signal detectable by the stop signal detector 54. The stop signal as amplified by the amplifier 55 closes relay 56 which opens the contact serving lead 54, stopping the play mechanism.

For the condition when the teaching machine seeks some subsequent frame in the reverse direction, exactly the same process as described above for the forward direction is followed except the teaching machine will give a continuing reverse drive signal to its motor system which is presented on lead 57. This sets flip-flop 36, whose output 58 operates relay 61, closing a contact to put power from line 53 into line 62, which operates the tape recorder's reverse mechanism. There is also one other problem in this reverse mode that must be overcome. As we start a reverse stepping sequence with frames, the sound tape must first be returned to its start position and then from this point begin matching steps with the frames on the teaching machine. This is accomplished simply by immediately placing a single signal to set flip-flop 37. This signal is initiated by the leading edge of the reverse signal presented by the teaching machine on line 57, which also causes the ONE SHOT circuit 63 to send an output on line 64 and thence to set flip-flop 37. The setting of flip-flop 37 operates relay 46 and stops the teaching machine motor from moving off its frame until the recorder motor moves the tape in the reverse direction to the start of the portion it is on. When this start signal is detected by detector 43 so as to set-flip 38 and consequently produce a reset output from AND gate 48, which resets flip-flop 36 through lead 60; the film strip and tape then move in reverse directions together and match up at the start of each sound portion and at the projectable position of each frame until the desired frame is reached.

This same circuit which provides a single reversal of the tape portion to its start can be used to give a replay. For example, a student may listen to the audio message while looking at the visual presentation and decide he wants to hear it again; that is, have it repeated. By depressing push-switch 65 a signal is sent to set flip-flop 36 which supplies current to operate relay 61 and thence operate the reverse mechanism of the tape recorder. Also, a signal is initiated from the ONE SHOT circuit 63 which sets flip-flop 37. When the start of the sound portion is detected by detector 43, to set flip-flop 38, the reversing is stopped first by activating relay 52, thus opening its contact and killing the recorder motor, and second it is stopped by providing the second input signal to the AND gate 48 which produces the reset pulse that resets all flip-flops, resulting in all relays being unoperated. In this condition, the contact of relay 56 presents power on lead 54 to activate the play mechanism of the tape recorder and thereby replay the portion.

In the above-described operation for FIG. 5, the drive motors for either the tape recorder or the teaching machine are momentarily deactivated as necessary at each adjacent frame or sound portion until the frame and the sound portion are matched. Upon securing a match, the delays on the motors are removed and the teaching machine is permitted to advance another frame and the tape recorder another sound portion, followed by a repetition of the matching procedure. This continues until the teaching machine reaches its final desired frame and stops to project the frame, at which instance the tape recorder is also stopped and put into a play condition. The disadvantage inherent in this system is the numerous momentary delays encountered at each frame in order to accomplish a match. This can decidedly slow down the time between frame projections, especially when a consequent projection consists of a frame perhaps five or more frames away, along the film strip from the frame at which a student made a selection. To overcome this difficulty, the circuit of FIG. 6 uses a chain of flip-flops which count frames as they are passed by the projectable position of the teaching machine. The passage of each portion of the sound tape subtracts a count. This lets the teaching machine run freely until it stops normally at its final desired frame. Meanwhile, the tape recorder drives its tape to catch up; and even though the teaching machine may be several frames ahead of associated portions of the sound tape when it reaches projectable position, the tape recorder will continue to drive in fast forward or reverse condition until it counts off the frames that are ahead so as to catch up. Thus, the teaching machine is never delayed. It is possible that at times the tape recorder may transport tape from portion to portion faster than the film moves from frame to frame, but since the teaching machine is the central control and only "knows" how far it will go, the tape recorder will be delayed wherever necessary to keep the frame movement ahead of it.

Figure 8:
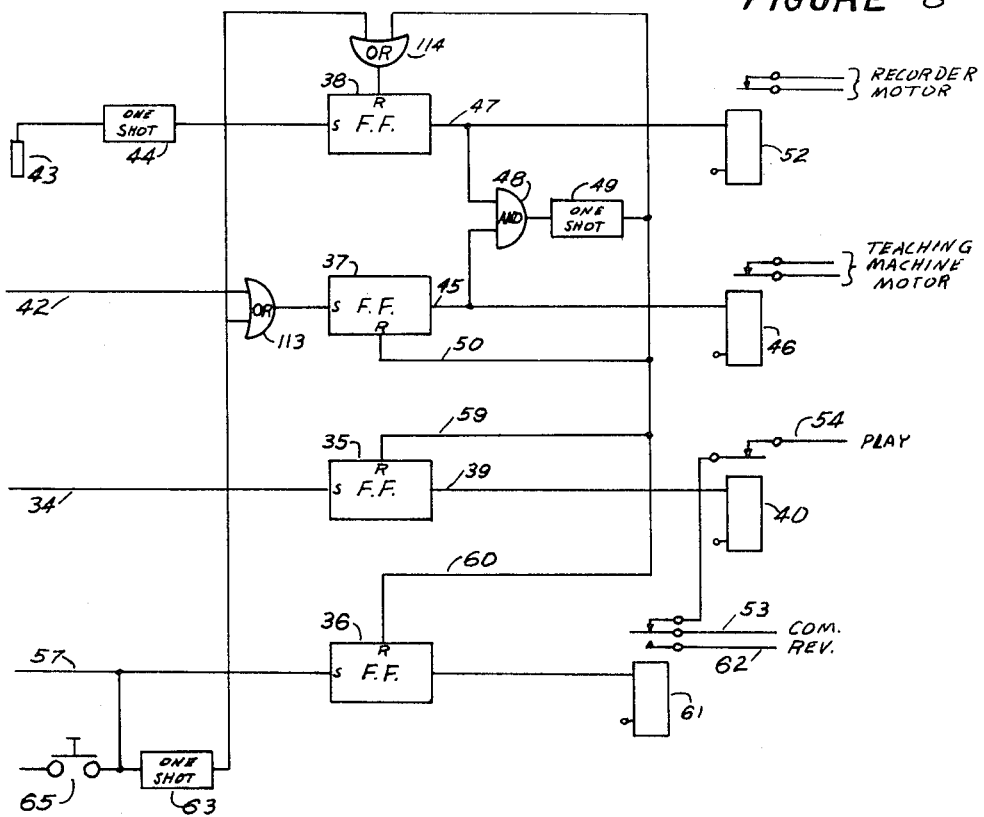
FIG. 8 shows a circuit diagram of a device for combining the start and stop detection functions of the circuit of FIG. 5 and thereby permitting simplification of the start and stop indicators shown in FIG. 3.

Another version of the circuit of FIG. 5 is shown as FIG. 8. This circuit differs from FIG. 5 only in the elimination of the stop signal detector 54, amplifier 55 and relay 56, and the addition of OR circuit 114 and the connection of line 54 directly to the normally closed contacts of relay 40. This also allows for elimination of stop signal areas on the sound tapes of FIG. 3 shown as 18, 21 and 24 or of FIG. 4 as 27, 30 or 33.

Operation of the circuit of FIG. 8 is similar to that of FIG. 5 except that at the end of the audio message the tape will continue moving until the next beginning signal, be it 19, 22, 28 or 31, at which time detector 43 through the leading edge trigger 44 will set flip-flop 38, whose output on line 47 will operate relay 52, whose contact will open and remove power from the recorder motor.

If the next frame the teaching machine seeks is in the forward direction, the initial signal will be only on line 34 which will put the recorder in the fast forward condition, as described for FIG. 5, but the tape will not move as flip-flop 38 is continued in the set condition holding relay 52 operated. As the teaching machine reaches the first adjacent frame, a pulse signal appears in line 42 which, through OR circuit 113, sets flip-flop 37 and indicates synchronization between the two machines and circuit operation continues as previously described for FIG. 5.

If the next frame the teaching machine seeks is in the reverse direction, initial signals appear on both lines 34 and 57, setting flip-flops 35 and 36, operating relays 40 and 61, which removes any play signal and operates the tape recorder reverse mechanism. The signal on line 57 will also cause ONE SHOT 63 to produce a momentary pulse on line 64 which will set flip-flop 37 through OR circuit 113 and reset flip-flop 38 through OR circuit 114. Under this condition the tape recorder will operate in the reverse direction and the teaching machine will wait until detector 43 finds the next beginning signal to set flip-flop 38, after which the two machines will operate in synchronism as previously described for FIG. 5.

Momentary closing of switch 65 will set flip-flops 36 and 37 and reset flip-flop 38 causing the tape player to return to the beginning of the last audio program and replay it.

In FIG. 6, elements of the circuit that are identical with functions of elements in FIG. 5 bear the same identifying numerals. The forward or reverse drive of the teaching machine appears on leads 34 or 57, respectively, setting either flip-flops 35 or 36, operating either relay 40 or 61, to operate the Fast Forward or Reverse control of the tape recorder. The tape recorder motor will not move, however, until relay 66 is operated. The first adjacent frame reached by the teaching machine will cause a pulse output from the ONE SHOT circuit 67. This output on lead 42 sets flip-flop 68. The output of the flip-flop 68 is delayed slightly by the delay circuit 69 and then appears as a stationary signal on one input of an AND gate 70. This signal also is presented on lead 71 where it goes to OR gate 72. The output from OR gate 72 operates relay 66 so that the tape recorder starts its movement.

If the first adjacent frame has been passed and the teaching machine has reached the second adjacent frame, a signal is sent to ONE SHOT circuit 67 with an output on 42. However, as described in the previous paragraph, flip-flop 68 is already set. Therefore, this second signal on lead 42 appears on lead 73 as an input to AND gate 70. Since the flip-flop 68 was previously set, there is already a signal present at the other input to AND gate 70. Hence, the AND gate 70 gives an output which sets flip-flop 74. Now we have set conditions in flip-flops 68 and 74, or we can say that stages 1 and 2 of the counting chain are set because two frames have been passed.

Let us next imagine that by this time the first adjacent position of the sound tape is being passed. Detection of its start area (such as areas 19, 22, 28, etc., of FIGS. 3 and 4) is made by detector 43, which produces a pulse output from the ONE SHOT 44. This output is capable of resetting flip-flops. Since stage 1, flip-flop 68, is set, the appearance of the one-shot signal on lead 75 resets stage 1. This does not affect stage 2; however, which remains in its set condition; and its output on lead 76 keeps OR gate 72 producing the output necessary to keep relay 66 closed so that the tape recorder motor will continue to run.

Next, let us imagine that another frame is reached. The input at ONE SHOT 67 produces a signal on lead 42 which sets flip-flop 68 again. This has no effect on stage 2, which remains in its previously set condition. Now let us suppose that still another frame is passed and the tape recorder has not yet reached the next adjacent start of a sound portion on the tape, the frame again causes an output from ONE SHOT 67 and the signal on 73 will be an input to AND gate 70. AND gate 70 gives an output because the previously set flip-flop 68 has an output signal present on the other input of AND gate 70. The output from AND gate 70 does not change the condition of flip-flop 74 which has previously been set. It is therefore appears on lead 77 as an input to AND gate 78. Because of the set condition of flip-flop 74, there is signal also present on the other input lead of AND gate 78; thus, causing an output which sets flip-flop 79.

Flip-flop 79 is shown as in stage N. That is, this circuit is not restricted to the number of counter stages it might have. Since an additional flip-flop is set as a frame is reached by the teaching machine, but a flip-flop is reset by each start spot reached as sound portions are scanned, the number of flip-flops in set condition at any single moment is the *difference* between the frames passed and the tape portions passed. Therefore, the number of stages required need be only what one might expect would be needed to keep the film strip running without delay. In other words, experience might show that almost never does the frame movement get ahead of the scanning of tape portions by more than four frames. In this case, the number of stages similar to stage 1 or 2 of FIG. 6 need be only three, while the last, that is the fourth stage, would be like stage N.

Let us suppose, however, that the case did arise where the teaching machine was moving frames past at a much greater rate than tape portions were being moved past by the tape recorder. Consequently, the difference in frame count over sound portions passed would cause all stages to be set. This means that output signals would be present from all flip-flops and appear on AND gate 80. Since all inputs have signals present, this causes an output to relay 46 which opens the lead on the teaching machine motor. Thus, the teaching machine delays further movement of the film strip until the sound tape catches up.

Let us suppose that the desired frame has been reached, but that the sound tape has two more portions to run past before it is in synchronization with the frames. Let us further suppose that these two portions are represented by the presence of set flip-flops 74 and 79 (flip-flop 68 is not set). The next start position reached on the sound tape will cause a signal output from ONE SHOT 44 on line 75. This does not reset flip-flop 68 which is already defined as in a reset condition. Since it is in a reset condition, it gives no output signal on lead 71, which means that inverter circuit 81 of AND gate 82 will produce a signal into AND gate 82. The presence of a signal also on lead 75 thereby causes AND gate 82 to give an output which resets flip-flop 74 via lead 83. Now only flip-flop 79 remains set. The next start signal from the tape produces an output from ONE SHOT 44 which puts an input on lead 75 of AND gate 82 while no output on lead 71 is inverted by 81 to produce the second input on AND gate 82. The output from AND gate 82 finds flip-flop 74 already reset so. Because of the reset condition of flip-flop 74, there is no output on lead 76, which means there is an output from inverter 84. This means AND gate 85 has two inputs present and therefore gives an output which resets flip-flop 79. The tape has caught up with the frame and reduced the difference to zero in the number of frames passed from the number of sound portions passed since their respective previous stationary positions. There is also no outputs from any of the flip-flops 73, 74 or 79 so that there is no output from OR gate 72. This releases relay 66 to cut off the recorder motor from driving any longer in the Fast Forward or Reverse mode.

The lack of signal from OR gate 72 causes inverter 86 to produce a signal which activates ONE SHOT circuit 87. The output from this circuit resets flip-flops 35 and 36 through leads 59 and 60 respectively.

The circuit performs in the reverse direction in the same general manner as described for reverse mode for the cicuit of FIG. 5. This also holds true for the repeat function caused by depressing pushbutton 65.

There is one type of teaching machine which, the moment one of its selection pushbuttons is pushed, causes generation of a set of signals that can be interpreted immediately as telling how many frames the film will move before it comes to reset at the next desired frame. Because this type of teaching machine moves frames past a given reference position, it can use either of the above described methods to cause a sound tape with sound portions to follow it; but because it generates signals immediately as to how many frames it will travel, it can use an entirely different method for associating a proper sound tape portion with each of its frames. It becomes very evident that the said described signals from such a teaching machine can be used to set elements of a counter; and then as the sound tape travels in a forward or reverse direction, it moves just the number of portions stored on the counter. FIG. 7 shows such a circuit. Elements of the circuit having the same functions as described in previous circuits will bear identical identifying numerals.

Let us suppose that such a teaching machine gives indication of where its next frame will be by sending out the following binary codes:

100 _____ Will move 7 adjacent frames.
010 _____ Will move 6 adjacent frames.
110 _____ Will move 5 adjacent frames.
001 _____ Will move 4 adjacent frames.
101 _____ Will move 3 adjacent frames.
011 _____ Will move 2 adjacent frames.
111 _____ Will move 1 adjacent frames.

As is familiar to binary circuitry this system could be expanded to cover movement over as many adjacent frames as desired. For the sake of illustration, we shall assume that the teaching machine signals that it will move its film strip two frames; this means it will give out code 011 which appears at set inputs 88, 89 and 90 respectively, causing flip-flop 91 to not be set, giving no output at 94; flip-flop 92 to be set, giving output at 95; and flip-flop 93 to be set, giving output at 96. The presence of any output will generate output current from OR gate 97 which operates relay 40, providing power from common lead 53 to lead 41 which activates the Fast Forward mechanism of the tape recorder. However, if the teaching machine has signaled also that it will be moving in a reverse direction, then such signal will appear on line 57 to set flip-flop 36 which operates relay 61. This transfers the power line 53 to line 62 which activates the Reverse mechanism of the tape recorder.

As the tape recorder runs either forward or reverse, the start position of each of its tape's sound portions is detected by detector 43 which generated a signal through amplifier 98. As the first such start position is reached, the signal from detector 43 and amplifier 98 goes to the trigger input of flip-flop 91. This type of flip-flop differs from those previously used in that it possesses a trigger input in lieu of a reset input. The trigger input changes the condition of the flip-flop from whatever condition it is in. If lead 94 is "on" (1) then lead 99 is "off" (0), a signal on the trigger changes lead 94 to an "off" (0) condition and lead 99 to "on" (1); if lead 94 is 0 and lead 99 is 1, a signal on the trigger changes lead 94 to 1 and lead 99 to 0. Since flip-flop 91 was originally set by the teaching machine coded outputs so that lead 94 would be at a 0 or off condition, the trigger changes it to a 1 or on condition. It also gives a 0 output on lead 99. Since a 0 output on lead 99 will not trigger flip-flop 92, flip-flop 92 remains unchanged and flip-flop 93 will also remain unchanged. The condition of the flip-flops after reaching one start portion of the tape is now flip-flop 91 is 1, flip-flop 92 is 1, flip-flop 93 is 1. As long as any of these flip-flops are in a 1 state, their outputs through OR gate 97 will keep the recorder running in either its originally set Fast Forward or Reverse conditions.

Now another sound portion is passed and a start is reached. This is detected with an output ultimately coming from amplifier 98. This triggers flip-flop 91, changing output 94 from a 1 state to a 0 state. The output 99 becomes therefore 1, which triggers flip-flop 92, changing its output 95 to a 0 and its output 100 to a 1. The 1 output at lead 100 triggers flip-flop 93 so that its output 96 changes to 0. Thus, the outputs of the three flip-flops to OR gate 97 is now 0, 0, 0.

If the sound recorder had been in the fast forward mode, the 0 output from OR gate 97 releases relay 40 so that current would be removed from lead 41. The Fast Forward mechanism would be deactivated.

If the sound recorder had been in the reverse mode, the 0 output from OR gate 97 would be directed by lead 101 to AND gate 102, which also has no signal present on its input lead 103 because flip-flop 104 was set when indication was first given that the tape should travel in a reverse direction. The simultaneous absence of signals on leads 101 and 103 is changed by inverters 105 and 106 so that AND gate 102 gives an output to ONE SHOT 107, which sends a signal through lead 108 to set flip-flops 91, 92 and 93 once again with their outputs at leads 94, 95 and 96 showing 1, 1, 1. Also, ONE SHOT 107 puts output current through lead 109, which resets flip-flop 104. Since flip-flops 91, 92 and 93 now have a new coding, the tape recorder will continue one more sound portion and the detection of a start signal will trigger flip-flops 91 changing it again to a 0, which causes a chain response as previously described so that the state of the flip-flops becomes 0, 0, 0. This time the null condition from OR gate 97 through lead 101 will have no effect on AND gate 102 because flip-flop 104 is reset and provides a signal on lead 103 to AND gate 102. Looking at AND gate 110, it is evident that both of its input leads are at this moment in null conditions. Hence, the null output of AND gate 110 is inverted by inverter 111 to give an output which through ONE SHOT 112 resets flip-flop 36. This removes output from lead 58 which releases relay 61 and consequently turns off the reversal mechanism of the tape recorder. The reader will remember that it has been necessary to always provide for one additional movement of tape in the reverse condition because the tape must pass over the sound portion it has just played. For this reason, we have the more complex procedure for deactivating the reverse condition of the tape recorder.

The start and stop of the play control lead 54 are as described for FIG. 5. The action of the replay pushbutton 65 should also be self-evident inasmuch as we are in effect activating the reverse circuit which gives a 1, 1, 1 condition on flip-flops 91, 92 and 93 as described in the immediately preceding paragraph.

The foregoing description and accompanying drawings are not to be considered as limitations upon the invention which is susceptible of obvious modifications, improvements and additions in electrical circuits and relay connections without departing from the siprit or scope of the invention. It is intended, therefore, that the instant invention be limited only to the scope set forth in the following claims.

What is claimed is:

1. A control means for a taped audio reproducing means comprising:
   (A) means to detect first signals indicating the direction of movement of a visual record;
   (B) means to detect second signals and to record the number of such second signals thereby indicating the number of visual messages passing a visual projection screen;
   (C) means to move an audio record past a detecting station in correlation with said first signals;
   (D) means to detect third signals indicating the beginning or end of a message on an audio record; and
   (E) means to compare the number of said second signals and the number of said third signals.

2. The control of claim 1, further including means to reproduce an audio message when the number of said second signals equals the number of said third signals.

3. The control of claim 2, further comprising means to deactivate the means of audio reproduction when the message being reproduced is completed.

4. The control of claim 2, further comprising means to replay a given audio message.

References Cited

UNITED STATES PATENTS 3,141,243    7/1964    Chapman et al. _____ 35—9

WM. E. GRIEB, Primary Examiner